(12) United States Patent
Tjeenk Willink et al.

(10) Patent No.: US 7,909,912 B2
(45) Date of Patent: Mar. 22, 2011

(54) METHOD AND DEVICE FOR ENHANCING CONDENSATION AND SEPARATION IN A FLUID SEPARATOR

(75) Inventors: Cornelis Antonie Tjeenk Willink, The Hague (NL); Marco Betting, The Hague (NL); Jeroen Geldorp, The Hague (NL); Bart Prast, The Hague (NL)

(73) Assignee: Twister B.V., Rijswijk (NL)

( * ) Notice: Subject to any disclaimer, the term of this patent is extended or adjusted under 35 U.S.C. 154(b) by 323 days.

(21) Appl. No.: 12/066,346

(22) PCT Filed: Sep. 11, 2006

(86) PCT No.: PCT/EP2006/066207
§ 371 (c)(1),
(2), (4) Date: Mar. 10, 2008

(87) PCT Pub. No.: WO2007/031476
PCT Pub. Date: Mar. 22, 2007

(65) Prior Publication Data
US 2008/0196582 A1    Aug. 21, 2008

(30) Foreign Application Priority Data
Sep. 12, 2005 (EP) .................................. 05108324

(51) Int. Cl.
*B03C 3/014* (2006.01)
(52) U.S. Cl. ............. 95/58; 95/67; 95/73; 95/78; 96/16; 96/61; 96/74; 96/224; 422/24
(58) Field of Classification Search .............. 95/58, 66, 95/67, 73, 28, 78; 96/16, 61, 62, 74, 224, 96/2; 422/24
See application file for complete search history.

(56) References Cited

U.S. PATENT DOCUMENTS

| | | | | |
|---|---|---|---|---|
| 2,732,501 A | * | 1/1956 | Blaeker | 250/429 |
| 3,984,296 A | | 10/1976 | Richards | 204/157.1 |
| 4,102,654 A | * | 7/1978 | Pellin | 96/16 |

(Continued)

FOREIGN PATENT DOCUMENTS

EP       1017465       7/2000

(Continued)

OTHER PUBLICATIONS

Martens, J, et al: Homogenous Nucleation of Mercury Vapor—Journal of Chemical Physics, vol. 108, No. 23, pp. 2489-2492.

*Primary Examiner* — Richard L Chiesa
(74) *Attorney, Agent, or Firm* — Fliesler Meyer LLP

(57) ABSTRACT

A method is disclosed for enhancing condensation and separation in a fluid separator, wherein: —a fluid mixture is accelerated to a transonic or supersonic velocity in a throat section of a flow channel and thereby expanded and cooled such that at least some initially gaseous components become supersaturated and condense; —at least some condensed components are removed from the fluid mixture in the flow channel at a location downstream of the throat section; and —condensation of at least some supersaturated components is enhanced by illuminating the fluid mixture flowing through the flow channel by a radiation source (10), such as an Ultraviolet (UV) light source which excites and/or ionizes and induces mercury, water, aromatic hydrocarbons, carbon dioxide, hydrogen sulphide and/or other components to condense thereby forming condensation nuclei for other supersaturated fluid components.

15 Claims, 3 Drawing Sheets

U.S. PATENT DOCUMENTS

| | | | | |
|---|---|---|---|---|
| 5,364,457 A | * | 11/1994 | Cameron | 96/27 |
| 5,492,557 A | * | 2/1996 | Vanella | 96/16 |
| 5,681,374 A | * | 10/1997 | Von Glehn | 96/16 |
| 6,179,968 B1 | | 1/2001 | Izutsu et al. | 204/157.3 |
| 6,623,544 B1 | * | 9/2003 | Kaura | 95/3 |
| 6,663,690 B2 | | 12/2003 | Katz | 95/57 |
| 6,752,957 B1 | | 6/2004 | De Lasa et al. | 422/22 |
| 7,160,358 B2 | * | 1/2007 | Spink et al. | 95/65 |
| 7,261,766 B2 | * | 8/2007 | Betting et al. | 96/65 |
| 7,273,515 B2 | * | 9/2007 | Yuen | 96/16 |
| 2003/0202921 A1 | | 10/2003 | Kato | 422/186.3 |
| 2004/0262218 A1 | | 12/2004 | Betting et al. | 210/512.1 |
| 2005/0172802 A1 | * | 8/2005 | Betting et al. | 95/29 |
| 2006/0005708 A1 | * | 1/2006 | Yuen | 96/16 |
| 2006/0057020 A1 | * | 3/2006 | Tufo | 422/24 |
| 2006/0150819 A1 | * | 7/2006 | Yuen | 96/224 |

FOREIGN PATENT DOCUMENTS

| | | | | |
|---|---|---|---|---|
| EP | 1438540 | | 7/2006 | |
| EP | 1499419 | | 7/2007 | |
| JP | 62-53750 A | * | 3/1987 | 96/16 |
| JP | 10277355 | | 10/1998 | |
| WO | WO2005030366 | | 4/2005 | |

* cited by examiner

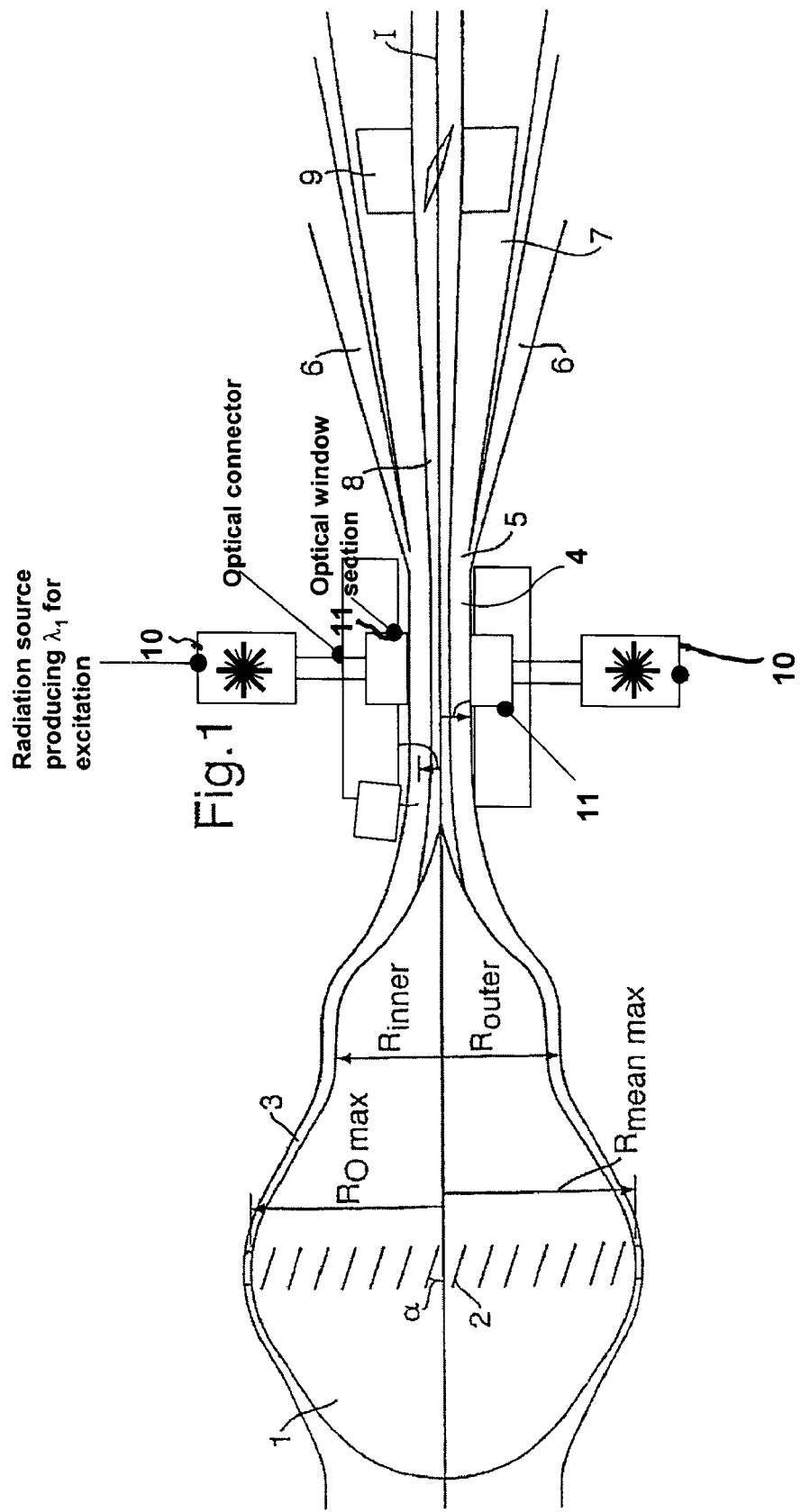

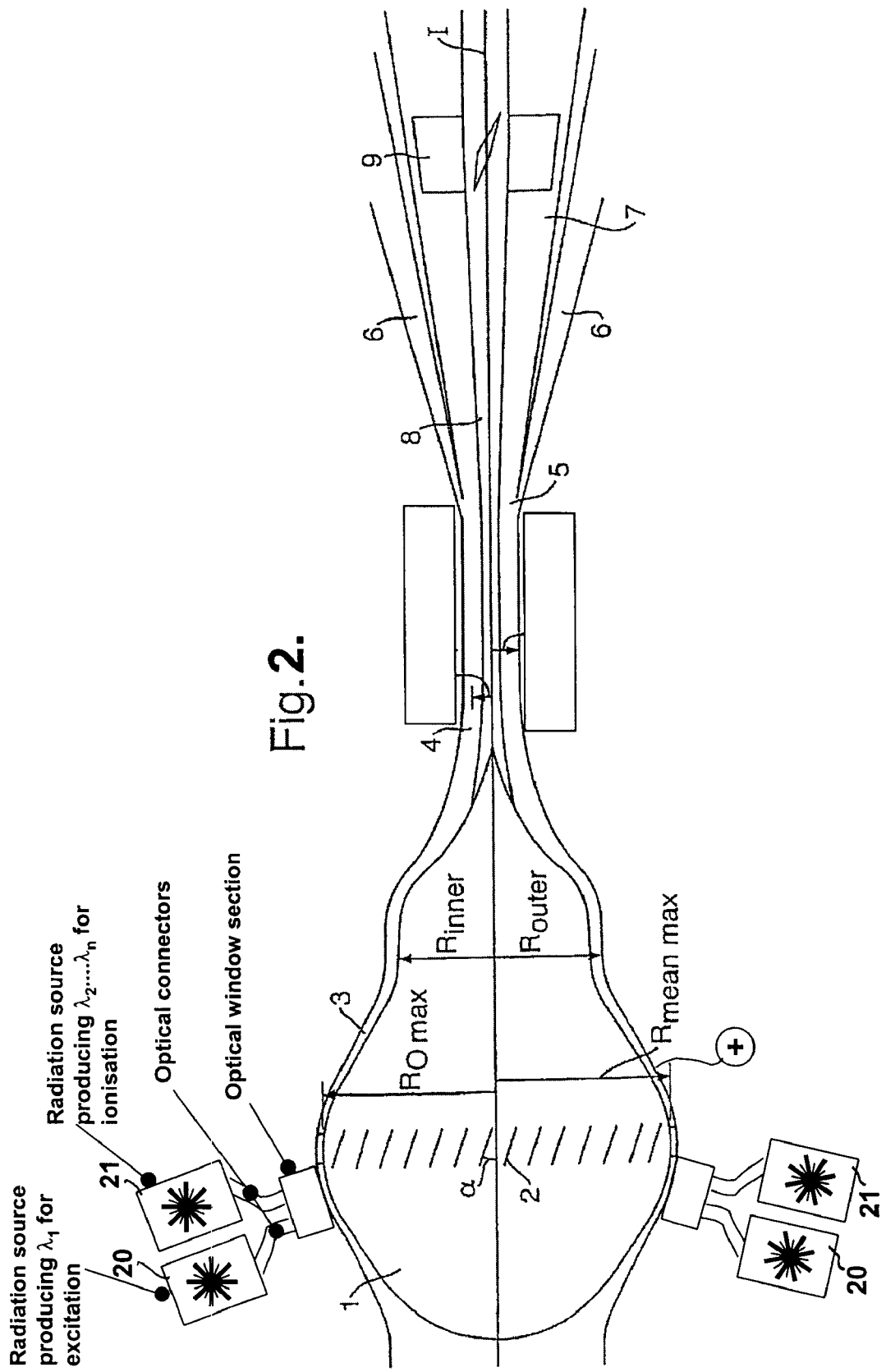

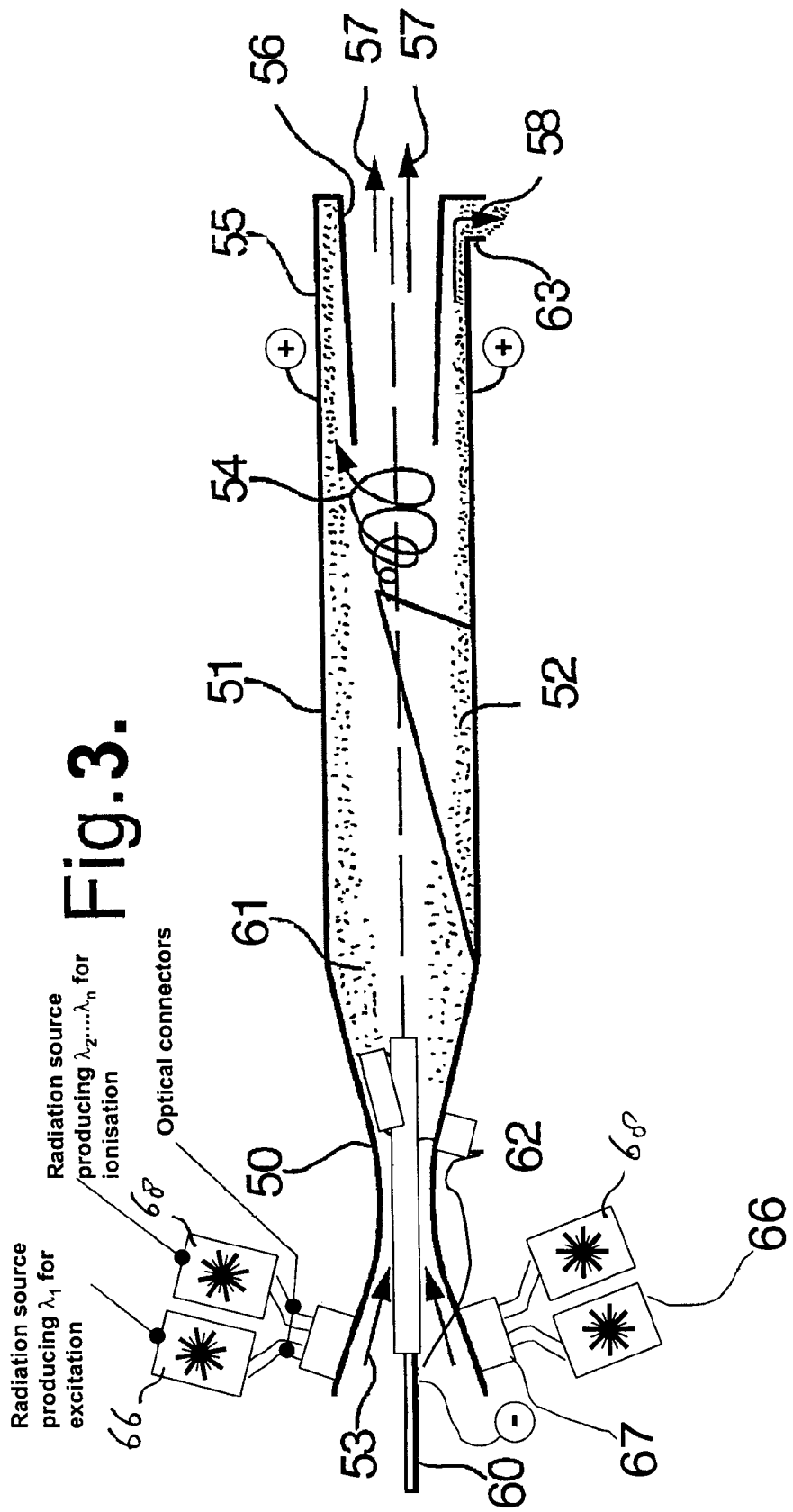

METHOD AND DEVICE FOR ENHANCING
CONDENSATION AND SEPARATION IN A
FLUID SEPARATOR

PRIORITY CLAIM

The present application claims priority to European Patent Application 05108324.4 filed 12 Sep. 2006.

This application is a national stage application which claims the benefit under 35 U.S.C. 371 to Patent Cooperation Treaty Application No. PCT/EP2006/066207, entitled "Method and Device for Enhancing Condensation and Separation in a Fluid Separator," by inventors Cornelis Antonie Tjeenk Willink et al., filed Sep. 11, 2006, and which has been published as Publication No. WO/2007/031476, which claims priority to European Patent Application No. 05108324.4 filed Sep. 12, 2005.

FIELD OF THE INVENTION

The invention relates to a method of enhancing condensation and separation in a fluid separator.

BACKGROUND OF THE INVENTION

It is known from European patent EP 1017465-B and from European patent applications EP1438540-A and EP1499419-A to separate a fluid mixture in a fluid separator in which the fluid mixture is accelerated in a throat section of a flow channel, whereby the fluid mixture is expanded and cooled such that at least some initially gaseous components condense and at least some condensed components are subsequently removed from the fluid mixture in the flow channel at a location downstream of the throat section.

The separators known from European patent EP 1017465-B and from European patent application EP1438540-A are cyclonic separators with a substantially cylindrical flow channel in which the fluid mixture may be accelerated to a transonic or supersonic velocity and wherein a swirling motion is imposed on the accelerated fluid mixture by one or more swirl imparting vanes. In the cyclonic fluid separator known from European patent EP 1017465-B one or more swirl imparting vanes are arranged downstream from the throat section of the fluid channel and in the cyclonic fluid separator known from European patent application EP 1438540-A the swirl imparting vanes are arranged upstream of the throat section of the fluid channel.

European patent application EP 1499419-A discloses a separator wherein a spray of electrically charged droplets is injected into the separator, with a slit-shaped or tubular nozzle in which the fluid stream is accelerated to a transonic or supersonic velocity and thereby expanded and cooled. This separator has an electrostatic charged wall that attracts the electrically charged droplets, which serve as nucleation sources for other initially gaseous components of the multiphase fluid stream of which at least some become supersaturated when they are cooled within the nozzle.

Japanese patent publication JP10277355 discloses a method for removing contaminants from air that is blown into a clean room for manufacturing semiconductors, wherein a UV light source is used to enhance nucleation of contaminants. The air blower will not cool the air and a large air cooling unit is required to cool the air to such a temperature that condensation of water and other contaminants will occur. This known method therefore requires large pieces of equipment with a significant power consumption.

The article 'Photoinduced nucleation in supersaturated mercury vapour' published on 15 Jun. 1998 by H. Uchtmann, R. Dettmer, S. D. Barovskii and F. Hensel in the Journal of Chemical Physics, volume 108, number 23, discloses that the rate of nucleation is increased if a supersaturated mercury vapour is illuminated with electromagnetic radiation absorbed by the mercury vapour atoms. The experiments described in this article were carried out in an upward thermal diffusion chamber.

It is known from U.S. Pat. No. 6,663,690 to remove elemental mercury from emissions of coal-fired utilities by the selective ionisation of mercury atoms using ultraviolet radiation, followed by electrostatic precipitation of the mercury atoms.

In this known method the mercury atoms are excited by the ultraviolet radiation and then ionised using radiation of a different wavelength and then exposed to a supersaturated water vapour to produce charged droplets, which are accumulated and removed from the flux of flue gases at the bottom of the stack. The stack therefore serves as a liquid settling chamber in which the charged droplets are removed from a flux of upwardly moving flue gases of which the velocity is low enough to inhibit the charged droplets to be dragged upwards by the flue gas stream.

A disadvantage of the mercury removal methods known from U.S. Pat. No. 6,663,690 is that liquid settling chambers require that the fluid mixture passes at such a low velocity through the chamber that liquid components are allowed to migrate to and settle at the bottom of the separation chamber. The known methods therefore require use of large pieces of equipment.

It is an object of the present invention to provide a fluid separation method that does not require large gravity settling chambers.

It is a further object of the present invention to provide a fluid separation method in which excitation of a selected component enhances the condensation of said component and/or ionisation of a selected component generates condensation nuclei for other supersaturated fluid components, such as polar components, such that in addition to the bonding of ionised components in the liquid phase, also condensation of other components is enhanced.

SUMMARY OF THE INVENTION

In accordance with the invention there is provided a method of enhancing condensation in a fluid separator, wherein:

a fluid mixture is accelerated in a throat section of a flow channel and thereby expanded and cooled such that at least some initially gaseous components become supersaturated and condense;

at least some condensed components are removed from the fluid mixture in the flow channel at a location downstream of the throat section;

condensation of at least some supersaturated components is enhanced by illuminating the fluid mixture flowing through the flow channel by a radiation source; and the fluid mixture is accelerated in the throat section to a transonic or supersonic velocity and thereby accelerated and substantially adiabatically cooled.

It has been found that when an initially supersaturated vapour component is brought from its ground state into an excited state via absorption of radiation, this promotes homogeneous condensation of the excited vapour component. The promotion of homogeneous condensation by bringing an initially supersaturated component into an excited state via absorption of radiation is further on referred to as Photo Induced Nucleation.

It has also been found that components, which are brought to the ionised state via absorption of radiation promotes heterogeneous condensation of other supersaturated components, which do not absorb radiation. Hereby the ionised components act as preferential condensation nuclei for other gaseous components, specifically for polar molecules. The promotion of condensation of other gaseous components by ionised components is further on referred to as Ion Induced Nucleation.

The fluid mixture may comprise natural gas and the method may be used to remove one or more fluid components, such as mercury, water, aromatic hydrocarbons, carbon dioxide and/or hydrogen sulphide, that are excited and/or ionised by illuminating the fluid mixture with electromagnetic radiation of a selected wavelength spectrum, such that the selected spectrum matches at least one spectral line of one of the fluid components to be excited and/or ionised. Preferably, the method comprises the steps of:

illuminating the fluid mixture by a first radiation source which transmits electromagnetic radiation of a wavelength spectrum that brings at least one initially gaseous component in an excited state;

illuminating the fluid mixture by a second radiation source, which transmits electromagnetic radiation of a different wavelength spectrum than the first radiation source into the flow channel, thereby ionising at least one gaseous component that has been brought into an excited state by the first radiation source;

exposing the ionised component to a fluid containing a supersaturated vapour that nucleates on the ions, such as a polar substance like water, thereby producing droplets containing ionised components.

The separator may be a cyclonic separator comprising:

a substantially cylindrical flow channel and throat section;

swirl imparting means for imparting a swirling motion to the fluid mixture flowing through the flow channel; and a fluid separation section located in the fluid channel downstream of the throat section and swirl imparting means, which fluid separation section comprises a central outlet channel and an annular outlet channel which co-axially surrounds the central outlet channel, such that a liquid enriched fluid fraction is induced to flow into the annular outlet channel and a liquid depleted fluid fraction is induced to flow into the central outlet channel.

The fluid separator according to the invention comprises:

a flow channel with a throat section for accelerating and thereby expanding and cooling a fluid mixture flowing there through such that at least some initially gaseous fluid components condense;

a separation section arranged in the flow channel downstream of the throat section in which at least some condensed components are removed from the fluid mixture in the flow channel at a location downstream of the throat section; and a radiation source for enhancing condensation of at least one component of the fluid mixture flowing through the flow channel;

wherein the throat section is configured such that the fluid mixture is accelerated in the throat section to a transonic or supersonic velocity and thereby accelerated and substantially adiabatically cooled.

The fluid separator may be a transonic or supersonic cyclonic fluid separator and the radiation source is adapted to transmit radiation with a spectrum comprising for example a 253.65 nm wavelength to excite Mercury atoms.

These and other features, embodiments and advantages of the method and apparatus according to the invention are described in the accompanying claims, abstract and the following detailed description of preferred embodiments in which reference is made to the accompanying drawings.

BRIEF DESCRIPTION OF THE DRAWINGS

FIG. 1 is a schematic longitudinal sectional view of a first embodiment of the separator according to the invention, which is provided with a radiation source to promote condensation via Photo Induced Nucleation of at least one fluid component;

FIG. 2 is a schematic longitudinal sectional view of a second embodiment of separator according to the invention, which is provided with preferably two radiation sources to promote condensation via Ion Induced Nucleation of at least one fluid component; and FIG. 3 is a schematic longitudinal sectional view of a cyclonic fluid separator in which a spray is injected and a radiation source is arranged to enhance the fluid separation efficiency.

DETAILED DESCRIPTION OF PREFERRED EMBODIMENTS

FIG. 1 shows a cyclonic inertia separator with a swirl inlet device comprising a pear-shaped central body 1 on which a series of swirl imparting vanes 2 are mounted and which is arranged co-axial to a central axis I of the separator and inside the separator housing such that an annular flow path 3 is created between the central body 1 and separator housing. The separator further comprises a tubular throat portion 4 from which in use the swirling fluid stream is discharged into a diverging fluid separation chamber 5 which is equipped with a central primary outlet conduit 7 for gaseous components and with an outer secondary outlet conduit 6 for condensables enriched fluid components. The central body 1 has a substantially cylindrical elongate tail section 8 on which an assembly of flow straightening blades 9 is mounted. The central body 1 has a largest outer width or diameter 2 $R_{o\,max}$, which is larger than the smallest inner width or diameter 2 $R_{n\,min}$ of the tubular throat portion 4.

The swirl imparting vanes 2 are oriented at an angle ($\alpha$) relative to the central axis I and create a circulation ($\Gamma$) in the fluid stream. It is preferred that $\alpha$ is between 20° and 50°. The fluid stream is subsequently induced to flow into the annular flow area 3.

In the annular space 3 downstream of the swirl imparting vanes 2 the swirling fluid stream is expanded to a high, preferably transonic or supersonic, velocity, wherein the mean annulus radius of the fluid channel 4 gradually decreases.

During this annular expansion two processes occur:
(1) The heat or enthalpy (h) in the flow decreases with the amount $\Delta h = -\frac{1}{2} U^2$, thereby condensing those flow constituents which first reaching phase equilibrium. This results in a swirling mist flow containing small liquid or solid particles.
(2) The tangential velocity component increases inversely with the mean annulus radius $U_\phi$ substantially in accordance with the equation:

$$U_{\phi,final} = U_{\phi,initial}(R_{mean,max}/R_{mean,min}).$$

This results in a strong increase of the centrifugal acceleration of the fluid particles (ac), which will finally be in the order of $a_c = (U_{\phi,final}^2 / R_{mean,min})$.

In the tubular throat portion 4 the fluid stream may be induced to further expand to higher velocity or be kept at a substantially constant speed. In the first case condensation is ongoing and particles will gain mass. In the latter case condensation is about to stop after a defined relaxation time. In both cases the centrifugal action causes the particles to drift to the outer circumference of the flow area adjacent to the inner wall of the separator housing, which is called the separation area. The time period for the particles to drift to this outer circumference of the flow area determines the length of the tubular throat portion 4.

Downstream of the tubular throat portion 4 the condensables enriched 'wet' fluid components tend to concentrate adjacent to the inner surface of the diverging fluid separation chamber 5 and the 'dry' gaseous fluid components are concentrated at or near the central axis I, whereupon the wet condensables enriched 'wet' fluid components discharged into an outer secondary fluid outlet 6 via a series of slots, (micro) porous portions whereas the 'dry' gaseous components are discharged into the central primary fluid outlet conduit 7.

In the diverging primary fluid outlet conduit 7 the fluid stream is further decelerated so that the remaining kinetic energy is transformed into potential energy. The diverging primary outlet conduit is equipped with an assembly of flow straightening vanes 9 to recover the circulation energy. Condensation is generally described as two processes taking place simultaneously: the formation of new droplets, called nucleation, and the further growth of the existing droplets. The nucleation rate J is defined as the number of new droplets formed per cubic meter per second. J depends on substance properties, the partial vapour pressure of the substance and temperature.

The cyclonic fluid separator in accordance with the invention is equipped with an Ultraviolet (UV) radiation source 10 which transmits radiation through a transparent window 11 in the wall in between the annular section 3 and the tubular throat portion 4 into the multiphase fluid stream with a wavelength spectrum which is absorbed by at least some fluid components, such as mercury, aromatics, hydrogen sulphide ($H_2S$), and/or carbon dioxide ($CO_2$) such that these components are excited and nucleation is promoted.

The nucleation rate of mercury is so small that mercury vapour cannot be removed from natural gas in a cyclonic separator when only normal homogeneous nucleation of the mercury occurs.

For mercury and various other gaseous compounds the rate of nucleation is greatly increased when the vapour is illuminated with radiation absorbed by the vapour molecules. In this specification and accompanying claims this phenomenon is referred to as Photo Induced Nucleation. For mercury vapour a strong effect of photo-induced nucleation has been observed which is caused by optical excitation of the mercury atoms.

By illuminating a mercury-containing natural gas stream with radiation of the right wavelength $\lambda 1$ and intensity, the nucleation rate of the mercury can be increased to the extent that the mercury can be removed in a cyclonic fluid separator.

Excitation of the mercury atoms is preferably achieved by illumination with 253.65 nm UV radiation. In FIG. 1 the radiation is applied in the throat section 4 where the fluid mixture is cooled to a low temperature in order to achieve a maximum nucleation rate.

The high mass-density of mercury contributes to an efficient separation of the condensed mercury droplets from the gas stream.

A low-pressure mercury lamp could be used as a radiation source 10 that transmits 253.65 nm UV radiation. Excitation of all of the mercury atoms in a typical gas stream with a flow rate of 1 million $Nm^3$/day and a mercury concentration of 200 $\mu g/Nm^3$ requires a minimum radiation power of 5.5 W absorbed by the mercury atoms. Other constituents of natural gas, beside mercury vapour, that absorb 253.65 nm radiation, are aromatics, such as benzene toluene and xylene. In a typical natural gas composition the total concentration of aromatics is not more than 0.1 mol-%, in which case the absorption of 253.65 nm radiation by the aromatics is of the same order of magnitude as the absorption by mercury. Consequently, the required power of 253.65 nm radiation will be of the order of tens of Watts, which can be supplied by a radiation source 10 comprising one or a few low-pressure mercury lamps.

FIG. 2 depicts a cyclonic fluid separator, which is substantially similar to the one described in FIG. 1, with a first radiation source 20, which transmits radiation comprising a wavelength $\lambda_1$ that raises the mercury or other components to an excited state—(for Hg preferably via the $6 3P1$ state)—and with a second radiation source 21, which transmits radiation of one or more other wavelengths $\lambda_2, \lambda_3, \ldots \lambda_n$ that ionises the excited mercury or other components. This is followed by nucleation of one or more vapours present in the gas stream onto the ions and removal of the ion-containing liquid droplets by the swirling motion of the gas stream.

In the case of mercury vapour in natural gas, water vapour present in the natural gas will nucleate on the mercury ions, followed by heterogeneous condensation of alkanes on the mercury-containing water droplets. The swirling motion of the gas stream subsequently removes the formed condensate droplets.

Apart from the arrangement of two radiation sources 20 and 21 the configuration of the centrifugal separation device shown in FIG. 2 is similar to the geometry of the device shown in FIG. 1 and corresponding components are identified by reference numerals similar to the reference numerals shown in FIG. 1.

In FIG. 2 both the first and the second radiation source 20 and 21 are arranged in the inlet section of the separator, upstream of the swirl imparting vanes 2. The first radiation source 20 excites the mercury and/or other atoms, and the second radiation source 21 subsequently ionises the excited mercury and other atoms.

Optionally an electric field, which is illustrated by a + sign is applied downstream the illumination region to remove the released electrons from the gas stream in order to prevent a rapid recombination of the mercury ions and electrons. When used in this specification and claims, the term excitation of an atom means that one or more electron(s) of the atom are raised to a higher orbital and the term ionisation of an atom means that at least one electron is released from the atom, so that the remaining ion has a positive charge.

In the embodiment shown in FIG. 2 the first radiation source 20 excites at least some mercury and/or other atoms and the second radiation source 21 subsequently ionises at least some of the excited mercury and/or other atoms in the multiphase fluid mixture.

Photo-ionisation of mercury and/or other initially gaseous fluid components can be accomplished in different ways.

The dissertation of H. Zobel "Resonante Mehr-Photonen-Ionisations Flugzeitspektroscopy und Quecksilber" published by GKSS Forschungszentrum in 1997 describes that it is preferred that mercury atoms are ionised by a preceding step wherein mercury atoms are excited to the $6^3P_1$ level by absorption of a 253.65 nm photon. In the embodiment of the invention shown in FIG. 2 this may be transmitted by the first radiation source 20. From this excited state mercury may be ionised in one step, by absorption of a photon whose energy is more than 5.55 eV, or in two steps, through a second (higher) excited state.

In U.S. Pat. No. 6,663,690 the following scheme is described:

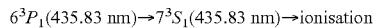

Another scheme might be:

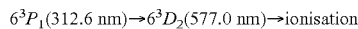

In any case, the short lifetime of excited states requires that the radiation sources 20 and 21 are arranged at a short mutual distance, preferably at a mutual distance of less than 25 cm, and/or in the same region of the tube.

A low-pressure mercury lamp could be used as the radiation source 20 for the $\lambda_1$=253.65 nm UV radiation. Excitation of all of the mercury atoms in a typical gas stream with a flow rate of 1 million $Nm^3$/day and a mercury concentration of 200 $\mu g/Nm^3$ requires a radiation power of 5.5 W absorbed by the mercury atoms. Other constituents of natural gas, besides mercury vapour, that absorb 253.65 nm radiation, are aromatics, mainly benzene, toluene and xylene. In a typical natural gas composition the total concentration of aromatics is not more than 0.1 mol-%, in which case the absorption of 253.65 nm radiation by the aromatics is of the same order of magnitude as the absorption by mercury. Consequently, the required power of 253.65 nm radiation will be of the order of tens of Watts, which can be supplied by one or a few low-pressure mercury lamps.

The wavelengths 312.6 nm, 435.83 nm and 577.0 nm, used in the examples given above, are emission lines in the spectra of medium- and high-pressure mercury lamps. Ionisation in one step from the $6^3P_1$ level could be accomplished, for example, with 185 nm radiation from a low-pressure mercury lamp, a 193 nm ArF excimer laser or a 172 nm Xe2 excimer lamp.

It may also be possible to use laser sources for all wavelengths in the ionisation scheme.

In general, a collision of an excited atom with another atom or molecule may cause a decay of the excited atom to a lower excited state or to the ground state. In the case of excited mercury atoms in the $6^3P_1$ state, a collisional transition to the lower $6^3P_0$ state is several times more probable than a transition to the ground state. The $6^3P_0$ state of mercury is a so-called metastable state, which means that a spontaneous or radiation-induced transition to the ground state is highly improbable. The probability of a collision-induced transition from the $6^3P_0$ state to the ground state is also orders of magnitude smaller than for the $6^3P_1$ state.

In the case of mercury vapour in a high-pressure carrier gas, the collision rate is very high. Consequently, it may be advantageous or even necessary to use an ionisation scheme that proceeds through the $6^3P_0$ state. For example:

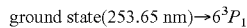

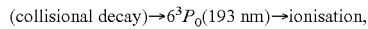

where ionisation is achieved in one step from the $6^3P_0$ state with a 193 nm ArF excimer laser. Alternatively, a 172 nm Xe2 excimer lamp or the 185 nm emission line of a low-pressure mercury lamp could be used for the last step.

Other schemes to achieve ionisation from the $6^3P_0$ state might be:

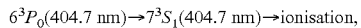

or

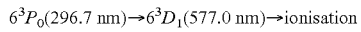

The wavelengths $\lambda_1, \lambda_2, \lambda_3, \ldots \lambda_n$ used in these schemes are emission lines in the spectra of medium- and high-pressure mercury lamps. Alternatively, these wavelengths could be generated with lasers.

The selection of the optimum ionisation scheme follows from the theoretical efficiency of the known ionisation schemes, the amount of absorption of the different wavelengths by the other constituents of natural gas, the availability of powerful radiation sources 20 and 21 for the different wavelengths and the transmission efficiency of optical accessories.

A description of the quantum mechanical notations, such as $6^3P_0$, $7^3S_1$ and $6^3D_1$, is provided on pages 90 and 91 of the book "Introduction to quantum mechanics", by David J. Griffiths of Reed College, ISBN 0-13-124405-1.

FIG. 3 shows a cyclonic fluid separator with an upstream acceleration section 50 in which a fluid stream 53 is accelerated to a supersonic velocity and thereby expanded and cooled, a tubular midstream section 51 comprising one or more wings 52 which induce a vortex 54 in the supersonic fluid stream and a downstream separation section 55 in which a tubular vortex finder 56 separates a central condensables depleted gaseous stream 57 from an annular condensables enriched stream 58.

A spray injection tube 60 is located upstream of the acceleration section and injects a spray 61 of negatively charged fluids via small openings 62 into the separator. The tube 60 has a negative electrical potential so that the injected spray gains an electronegative charge. The separator is furthermore equipped with first and second radiation sources 66 and 68, which produce radiation via a window 67 in the wall upstream of the acceleration section 50 of the separator to promote ionisation of mercury and/or other initially gaseous components in the natural gas stream flowing through the separator.

The first radiation source or sources 66 preferably transmit $\lambda_1$=253.65 nm UV radiation and the second radiation source or sources 67 preferably transmit radiation of one or more different wavelengths $\lambda_1, \lambda_3, \ldots \lambda_n$, to yield positive ions of mercury or another gaseous component. These cations will adsorb on the surface of the negatively charged droplets injected by means of injection tube 60.

The inner surface of the tubular midstream section 51 and downstream separation section 55 have a positive electrical potential such that the negatively charged droplets are attracted to the outer periphery of the separator interior and coalesce into a liquid film or slurry that flows along the inner surface of the separator housing into the annular condensable enriched outlet port 63.

The ionisation of mercury and/or other initially gaseous components by the radiation sources 66 and 67, together with the injection of a fluid via an electrically charged spray injection tube 60 and the use of a separation section having an inner surface having an electrical potential opposite to that of the spray injection tube 60 significantly enhances the separation efficiency of the transonic or supersonic fluid separator depicted in FIG. 3. The cyclonic fluid separator shown in FIG. 3 can also be a separator of the type depicted in FIGS. 1 and 2.

It will be understood that the photo- and/or ion induced condensation of mercury, aromatics, hydrogen sulphide, carbon dioxide or other components in the natural gas or other multiphase fluid stream flowing through the transonic or supersonic fluid separators shown in FIGS. 1-3 provides condensation nuclei for other supersaturated vapour components in the cooled fluid stream, so that also condensation of other components, which are not excited and/or ionised by the radiation sources 10, 20, 21 and/or 66, takes place. Consequently a synergetic effect is provided between the photo and/or ion induced nucleation of some components and the temperature induced condensation of some other components.

When used in this specification and claims the term supersonic velocity means that the multiphase fluid stream flows through the separator at a velocity which is higher than the local speed of sound in the multiphase fluid and the term transonic velocity means that the multiphase fluid stream flows through the separator at a velocity which is at least 0.8 times the speed of sound in the multiphase fluid. It will be understood that the method according to the invention may be used to enhance condensation and separation in fluid separators for separating a multi-component natural gas and/or any other multi-component gases, with or without solid particles, such as syngas, coal gas, biogas, process gas, exhaust gas, flue gas.

What is claimed is:

1. A method of enhancing condensation and separation in a fluid separator, wherein:
    a fluid mixture is accelerated in a throat section of a flow channel and thereby expanded and cooled such that at least some initially gaseous components become supersaturated and condense;
    at least some condensed components are removed from the fluid mixture in the flow channel at a location downstream of the throat section;
    condensation of at least some supersaturated components is enhanced by illuminating the fluid mixture flowing through the flow channel by a radiation source; and
    the fluid mixture is accelerated in the throat section to a transonic or supersonic velocity and thereby accelerated and substantially adiabatically cooled.

2. The method of claim 1, wherein the fluid mixture comprises natural gas and the method is used to remove one or more fluid components that are excited by illuminating the fluid mixture with electromagnetic radiation of a selected wavelength spectrum.

3. The method of claim 1, wherein one or more fluid components in the fluid mixture are excited by illuminating the fluid mixture with electromagnetic radiation of a selected wavelength spectrum, wherein the selected wavelength spectrum is selected such that the spectrum matches at least one spectral line of at least one fluid component that is to be excited.

4. The method of claim 2, wherein said excited fluid components are selected from the group consisting of mercury, water, aromatic hydrocarbons, carbon dioxide, hydrogen sulphide and mixtures thereof.

5. The method of claim 1, wherein the radiation source transmits a radiation spectrum comprising ultraviolet (UV) radiation through a window in the wall of the flow channel at a location in the vicinity or upstream of the throat section.

6. The method of claim 4, wherein the radiation source transmits 253.56 nm UV radiation.

7. The method of claim 1, wherein the method comprises the steps of:
    illuminating the fluid mixture by a first radiation source which transmits radiation of a wavelength spectrum that brings at least one initially gaseous component in an excited state;
    subsequently illuminating the fluid mixture by a second radiation source, which transmits radiation of a different wavelength spectrum than the first radiation source into the flow channel at a location downstream of the location of the first radiation source, thereby ionising at least one gaseous component that has been brought into an excited state by the first radiation source; and
    exposing the ionised component to a fluid containing a supersaturated vapour that nucleates on the ions, thereby producing droplets containing ionised components.

8. The method of claim 7, wherein the component, which is brought into an excited state by the first radiation source are selected from the group consisting of mercury, water, aromatic hydrocarbons, carbon dioxide and/or hydrogen sulphide.

9. The method of claim 7, wherein the concentration of the vapour that is intended to nucleate on the ions is monitored and, if this concentration is below a selected value, a vapour that nucleates on the ions is injected into the fluid stream at a location in the vicinity of the illumination region.

10. The method of claim 1, wherein the separator is a cyclonic separator comprising:
    a substantially tubular flow channel and throat section;
    swirl imparting means for imparting a swirling motion to the fluid mixture flowing through the flow channel; and
    a fluid separation section located in the fluid channel downstream of the throat section and swirl imparting means, the fluid separation section comprises a central outlet channel and an annular outlet channel which co-axially surrounds the central outlet channel, such that a liquid enriched fluid fraction is induced to flow into the annular outlet channel and a liquid depleted fluid fraction is induced to flow into the central outlet channel.

11. The method of claim 1, wherein the fluid mixture comprises natural gas and the method is used to remove one or more fluid components that are ionised by illuminating the fluid mixture with electromagnetic radiation of a selected wavelength spectrum.

12. The method of claim 11, wherein the selected wavelength spectrum is selected such that the spectrum matches at least one spectral line of at least one fluid component that is to be ionised.

13. The method of claim 11, wherein the said ionised fluid components are selected from the group consisting of mercury, water, aromatic hydrocarbons, carbon dioxide, hydrogen sulphide and mixture thereof.

14. A transonic or supersonic fluid separator comprising:
    a flow channel with a throat section for accelerating and thereby expanding and adiabatically cooling a fluid mixture flowing therethrough such that at least some initially gaseous fluid components become supersaturated and condense;

a separation section arranged in the flow channel downstream of the throat section in which at least some condensed components are removed from the fluid mixture in the flow channel at a location downstream of the throat section; and a radiation source for enhancing condensation of at least some supersaturated components by illuminating the fluid mixture flowing through the flow channel.

15. The fluid separator of claim 14, wherein the fluid separator is a transonic or supersonic cyclonic fluid separator and the radiation source is adapted to transmit ultraviolet radiation with a 253.65 nm wavelength.

* * * * *